Jan. 29, 1963

N. P. BORETTI 3,076,087

WELDING CONTROL CIRCUIT

Filed March 30, 1960

INVENTOR.
Napoleon P. Boretti

BY
C. P. Barnard
ATTORNEY

INVENTOR.
Napoleon P. Boretti
BY
R. P. Barnard
ATTORNEY

United States Patent Office 3,076,087
Patented Jan. 29, 1963

3,076,087
WELDING CONTROL CIRCUIT
Napoleon P. Boretti, Detroit, Mich., assignor to General Motors Corporation, Detroit, Mich., a corporation of Delaware
Filed Mar. 30, 1960, Ser. No. 18,658
9 Claims. (Cl. 219—89)

The present invention relates generally to a welding control circuit and more particularly to a pressure supply control system and mechanism adapted for use with a projection welding machine or a plurality of welding guns.

In projection welding, a plurality of projections are provided on a work piece and are adapted to engage a second work piece to be welded together. Projection welding machines generally include a welding head adapted to be moved into engagement with the upper of the work piece members and thereafter heat and pressure are applied causing the members to be welded together. The problem arises that if the welding head is moved too abruptly into engagement with the members, the impact force of the engagement tends to destroy or malform the projections in the upper work piece.

It is the purpose of the present control circuit to provide means whereby the welding head is moved slowly and under a low pressure into engagement with the work pieces after which an increased pressure is applied to maintain welding head engagement during the actual welding cycle.

The details as well as other objects and advantages of the present invention will be apparent from a perusal of the detailed description which follows.

Figure 1:
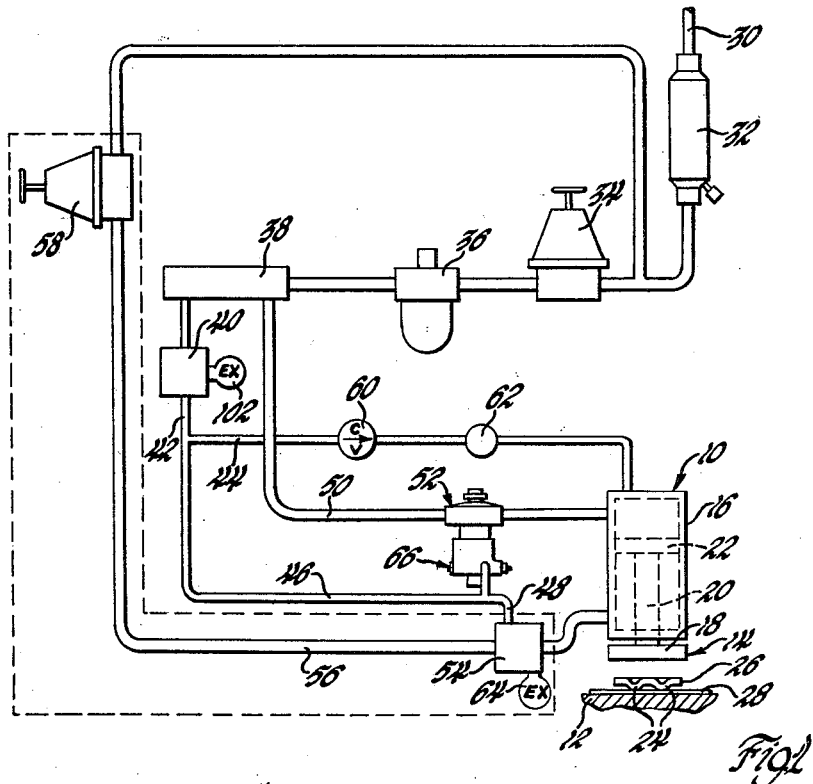
FIGURE 1 is a diagrammatic view of the subject welding control circuit.

Referring to FIGURE 1, a welding press is indicated generally at 10 and includes a fixed bed or die 12 and a movable head 14 slidably disposed in a power cylinder 16. Welding head 14 includes a work-engaging portion 18 which is connected through a rod 20 to a piston 22 slidably disposed within cylinder 16. The pressure supply welding control system of the invention permits the welding head 14 to engage the material to be welded with a relatively small negligible impact force in order to prevent damage to projections 24 which are normally formed in one work piece 26 by upsetting. In welding of the type indicated, if too great an impact pressure were applied by the head 14 in engaging the work material, the projections might be flattened thus impairing the quality of the subsequent weld. The actual welding operation is subsequently accomplished in the usual well known manner and does not, per se, constitute a part of the present invention. Suffice it to say that when a suitable pressure is applied while electric current is caused to flow between welding head 14 and lower platen 12, work pieces 26 and 28 will be welded along points aligned with projections 24.

In accordance with the teaching of the present invention, it is desirable to first contact work piece 26 with the welding head 14 with a relatively light engaging force and then apply a predetermined additional pressure during the welding operation to obtain the desired projection welds. As indicated above, illustrative control circuit provides this two pressure application of the work head to the work pieces.

The control circuit of FIGURE 1 illustrates welding head 14 in a retracted position. A main air supply line 30 leads through a filter 32, pressure regulator 34, and a lubricator 36 to a manifold 38. A solenoid actuated three-way pilot valve 40 is connected in an outlet line 42 from manifold 38. Line 42 communicates with pilot lines 44, 46 and 48. A somewhat larger supply line 50 connects manifold 38 to welding head cylinder 16 through a three-way valve 52. Valve 52 also communicates with pilot line 46.

Pilot line 48 connects with a three-way valve 54. A main supply line 56 also communicates with valve 54 and includes a pressure regulator 58. Pressure line 56 connects with cylinder 16 and provides welding head retracting pressure at the end of the welding cycle. Pilot line 44 is connected to cylinder 16 through a check valve 60 and a needle valve 62.

Figure 2:
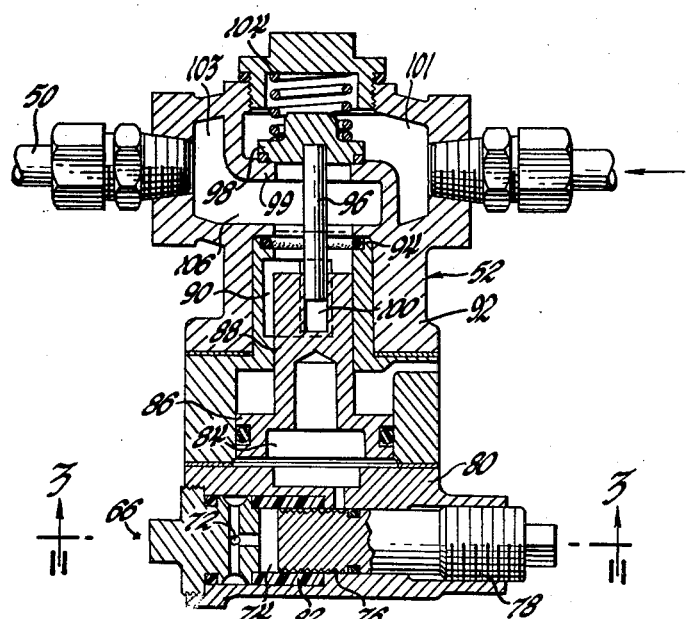
FIGURE 2 is an enlarged view of a time delay control valve.

During non-welding operation, valve 52 is normally closed as illustrated in the detailed view of FIGURE 2 of that valve. At the same time, valve 54 is open and air is supplied to cylinder 16 through line 56 to act on the bottom of piston 22 and hold welding head 14 in an upwardly retracted position. The press is loaded with the workpieces 26 and 28 at this point.

To begin the welding cycle, the valve 40 is first opened. Air under pressure is thus supplied to pilot lines 44, 46 and 48. Valve 54 immediately shifts, cutting off air pressure supply from line 56 and exhausting the pressure below piston 22 through valve exhaust passage 64. Thus, piston 22 is no longer positively held in its retracted position.

Figure 3:
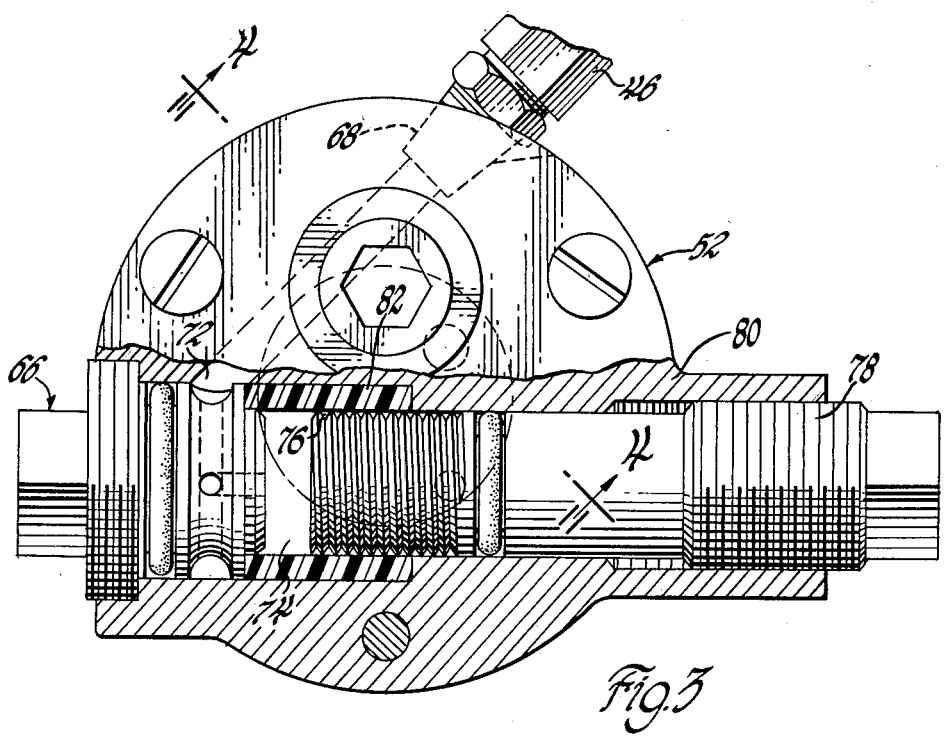
FIGURE 3 is a bottom view of the valve of FIGURE 2 with portions thereof broken away and shown in section substantially in the plane of the line indicated at 3—3 of FIGURE 2.
Figure 4:
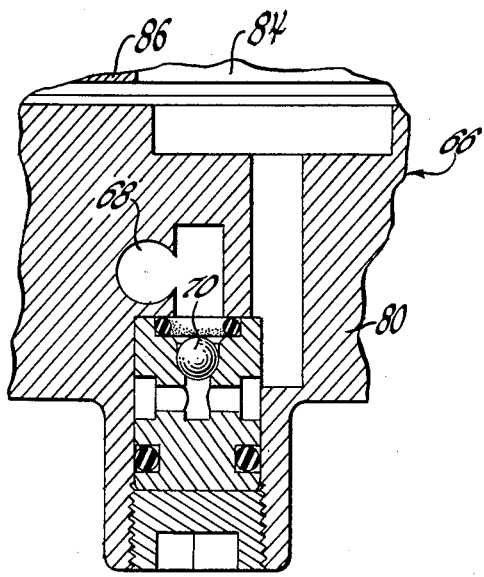
FIGURE 4 is a fragmentary sectional view taken substantially in the plane of the line indicated at 4—4 of FIGURE 3.

Pilot pressure in line 46 is metered through an adjustable helically threaded restriction of the time delay valve mechanism 66 shown in FIGURES 2–4. Referring briefly to time delay valve mechanism 66, pilot air pressure from line 46 enters port 68 and closes a one-way exhaust check valve 70. This forces air to flow along a passage 72 into the chamber 74. Air then follows a helical passage formed by a helical groove 76 formed in an adjustable plug 78 threadably disposed in casing 80 and which seals against a Teflon bushing 82. A controlled amount of air is thus allowed to pass through helical groove 76 into chamber 84 and to thereby actuate a piston 86. Upward movement of piston 86 causes a piston stem 88 to close an exhaust port 90 formed in a side wall of a valve casing 92. Thus the exhaust port is closed blocking communication of the power cylinder on the upper side of welding head piston to the atmosphere. Upward movement of piston 86 continues until stem 88 is in sealing contact with O-ring 94. This motion of valve piston 86 is permitted without imparting movement to a valve stem 96 of a second valve 98 by a provision of telescopic lost motion space 100 within piston stem 88. Casing 92 is divided by a valve port defining wall 99 into inlet and outlet chambers 101 and 103, flow therebetween being controlled by the valve 98. With valve 98 closed, as shown, outlet chamber 103 and hence the power cylinder above the piston 22 are exhausted to atmosphere through exhaust port 90. After the piston 86 moves upwardly to close exhaust port 90 and engages valve stem 96, valve 98 is opened to admit pressure from line 50 to the power cylinder above the welding head piston. Check valve 60 prevents high pressure air in cylinder 16 from flowing out of pilot line 44.

At the same time the main air supply valve 98 is being conditioned for opening, controlled air pressure flows through pilot line 44 and valves 60 and 62 into cylinder 16. Since airflow through line 44 is of a small quantity and substantial pressure build-up above piston 22 can occur only after closing of the exhaust port 90, the welding head 14 initially moves slowly downwardly into engagement with work piece 26 with only an extremely light impact thereby preventing damage to projections 24.

In summary, the time delay obtained by the variable restriction mechanism 66 allows sufficient time to permit the welding head 14 to engage work piece 26 with an initial light engaging force from pilot line 44 followed by the stronger holding pressure from line 50. This is accomplished by slowly bleeding air from pilot line 46 into chamber 84 through the helical restriction 76. The amount of time required to build up a sufficient pressure in chamber 84 to actuate piston 86 and hence valve 98 in sequence is controlled by the length of the helical restriction and the volumetric capacity of chamber 84. The length of helical restriction 76, in turn, is regulated by rotating adjustable plug 78 into or out of casing 80. The time delay is arranged so that air pressure in chamber 84 will further actuate valve piston 86 to open valve 98 only after the welding head 14 engages work piece 26 thereby permitting full line pressure to maintain the welding head in work engaging relation during the actual welding operation.

When the welding operation is completed, solenoid valve 40 is de-energized and all pilot line pressures are exhausted through exhaust passage 102. Rapid exhausting of the pilot line pressure from the valve chamber 84 is permitted by the ball check valve 70. This permits the air pressure applied to the upper end of the valve stem 88 to force the valve piston downwardly thus opening exhaust passage 90. This allows rapid exhaustion of the air pressure above piston 22 in cylinder 16 which would otherwise appreciably delay return of welding head 14 to the retracted position. Upon downward movement of the piston 86 venting the chamber 103, a spring 104 cooperates with the main air pressure supply to close valve 98 thus cutting off the main air supply to cylinder 16. Venting of the pilot supply pressure from the lines 46 and 48 permits the valve 54 to return to its open position wherein it again applies main air pressure through line 56 to the power cylinder on the lower side of piston 22 thereby returning the welding head 14 to its retracted position.

I claim:

1. A control circuit for an electric welding apparatus comprising a power cylinder, a welding head slidably mounted within said cylinder, a source of fluid under pressure, first conduit means communicating said fluid pressure source with said power cylinder, a first valve means in said first conduit means normally permitting fluid under pressure to flow to said cylinder to move said head to a retracted position, second conduit means connected in parallel with said first conduit means and adapted to communicate said fluid pressure with said power cylinder, a second valve means in said second conduit means normally blocking the flow of fluid pressure to said power cylinder, third conduit means communicating with said source of fluid under pressure and including a plurality of pilot lines, third valve means disposed in said third conduit means intermediate said fluid pressure source and said pilot lines and normally positioned to exhaust said pilot lines, first and second pilot lines respectively communicating with said first and second valve means, a third pilot line communicating with said power cylinder, said third conduit means being of smaller flow capacity than said first and second passage means, said third valve means being movable to a position admitting said fluid pressure to said pilot lines, said first pilot line being adapted to admit fluid pressure to said first valve means whereby the latter cuts off the flow of fluid pressure to said power cylinder and exhausts the pressure normally supplied thereto whereby the head is no longer positively held in a retracted position, said third pilot line metering fluid under pressure to said power cylinder to gradually move the head into a workpiece engaging position, said second pilot line admitting fluid under pressure to said second valve means whereby the latter is adapted to admit full fluid pressure to said power cylinder to maintain said head in its workpiece engaging position, said second valve means including a device adapted to delay the admission of full line pressure through the second conduit means to the power cylinder until such time as the pressure from the third pilot line has moved the head into its workpiece engaging position.

2. A control circuit as set forth in claim 1 in which said second valve means includes a valve element adapted to control the flow of said high pressure fluid to the power cylinder, spring means biasing the valve element toward a closed position, a fluid pressure responsive piston adapted to move the valve element toward an open position against the force of the spring means, and the full pressure delaying device of said second valve means including passage means for communicating fluid pressure from said second pilot line with said piston, and means for restricting the flow of fluid from the second pilot line to the piston.

3. A control circuit as set forth in claim 2 in which the flow restricting means comprises a casing having a cylindrical opening therein, a plug member threadably mounted in said opening, a helical groove formed in the periphery of said plug and cooperating with said casing to define a helical passage communicating at one with the second pilot line, the other end of said passage communicating with the fluid pressure responsive piston.

4. A time delay valve mechanism comprising casing means, fluid pressure inlet and outlet chambers formed in said means, a valve element controlling communication between said chambers, an exhaust port adapted to communicate the outlet chamber to atmosphere, a piston member slidably disposed in the casing means and adapted to control said exhaust port, a lost motion connection between said piston member and the valve element, a source of control pressure adapted to communicate with the piston member to move the latter thereby to block the exhaust port and thereafter open the valve element, and means intermediate said control pressure source and said piston member to control the rate of pressure build-up on said member.

5. A time delay valve mechanism as set forth in claim 4 in which the piston member includes a stem adapted to coact with said exhaust port, said stem having a central recess, said valve element including a stem slidably disopsed wtih the piston stem recess, said piston stem recess and said valve element stem being so related that limited movement of the piston member may occur before the valve element is opened.

6. A time delay valve mechanism as set forth in claim 4 in which the intermediate means comprises a plug adjustably mounted in the casing means, said plug including a helical groove formed in the periphery thereof and coacting with the casing means to define a helical fluid passage communicating said pressure source with said piston member, the length of said helical passage being variable by adjusting the position of the plug relative to the casing means.

7. A welding control circuit as set forth in claim 1 in which said second valve means and full pressure supply delaying device comprise a casing means having a pressure inlet and an outlet chamber formed therein connectable respectively to said second conduit means and said power cylinder, a valve element controlling communication between said chambers, said casing means having an exhaust port adapted to connect the outlet chamber to atmosphere, a piston member slidably disposed in the casing means and adapted to control said exhaust port, a lost motion connection between said piston member and the valve element, passage means connected to said second pilot line for fluid pressure supply to the piston member thereby moving the latter to block the exhaust port and thereafter open the valve element, and flow restricting means associated with said passage means and operable to control the rate of pressure build up on the piston member.

8. In a welding control circuit as set forth in claim 7, said piston member including a portion adapted to control said exhaust port and having a central recess in one end thereof, said valve element including a stem slidably disposed within the piston recess, said recess and stem being so related that limited movement of the piston may occur before the valve element is opened.

9. In a welding control circuit as set forth in claim 7, the flow restricting means comprising a casing having a cylindrical opening therein, a plug member threadably mounted in said opening, a helical groove formed in the periphery of the plug and cooperating with the casing to define a helical flow restricting passage communicating at one end with the second pilot line, the other end of said passage communicating with the fluid pressure responsive piston.

References Cited in the file of this patent

UNITED STATES PATENTS

| | | |
|---|---|---|
| 1,848,271 | Phelps | Mar. 8, 1932 |
| 2,270,767 | Platz | Jan. 20, 1942 |
| 2,286,104 | Platz | June 9, 1942 |
| 2,331,537 | Clark | Oct. 12, 1943 |
| 2,372,850 | Platz | Apr. 3, 1945 |
| 2,514,747 | Daniels | July 11, 1950 |
| 2,739,781 | Lyman | Mar. 27, 1956 |
| 2,928,644 | Heinicke | Mar. 15, 1960 |

FOREIGN PATENTS

| | | |
|---|---|---|
| 283,630 | Great Britain | Jan. 11, 1928 |

UNITED STATES PATENT OFFICE

CERTIFICATE OF CORRECTION

Patent No. 3,076,087                    January 29, 1963

Napoleon P. Boretti

It is hereby certified that error appears in the above numbered patent requiring correction and that the said Letters Patent should read as corrected below.

Column 4, line 27, after "one" insert -- end --; lines 47 and 48, for "disopsed wtih" read -- disposed with --.

Signed and sealed this 14th day of April 1964.

(SEAL)
Attest:

ERNEST W. SWIDER

Attesting Officer

EDWARD J. BRENNER

Commissioner of Patents